UNITED STATES PATENT OFFICE.

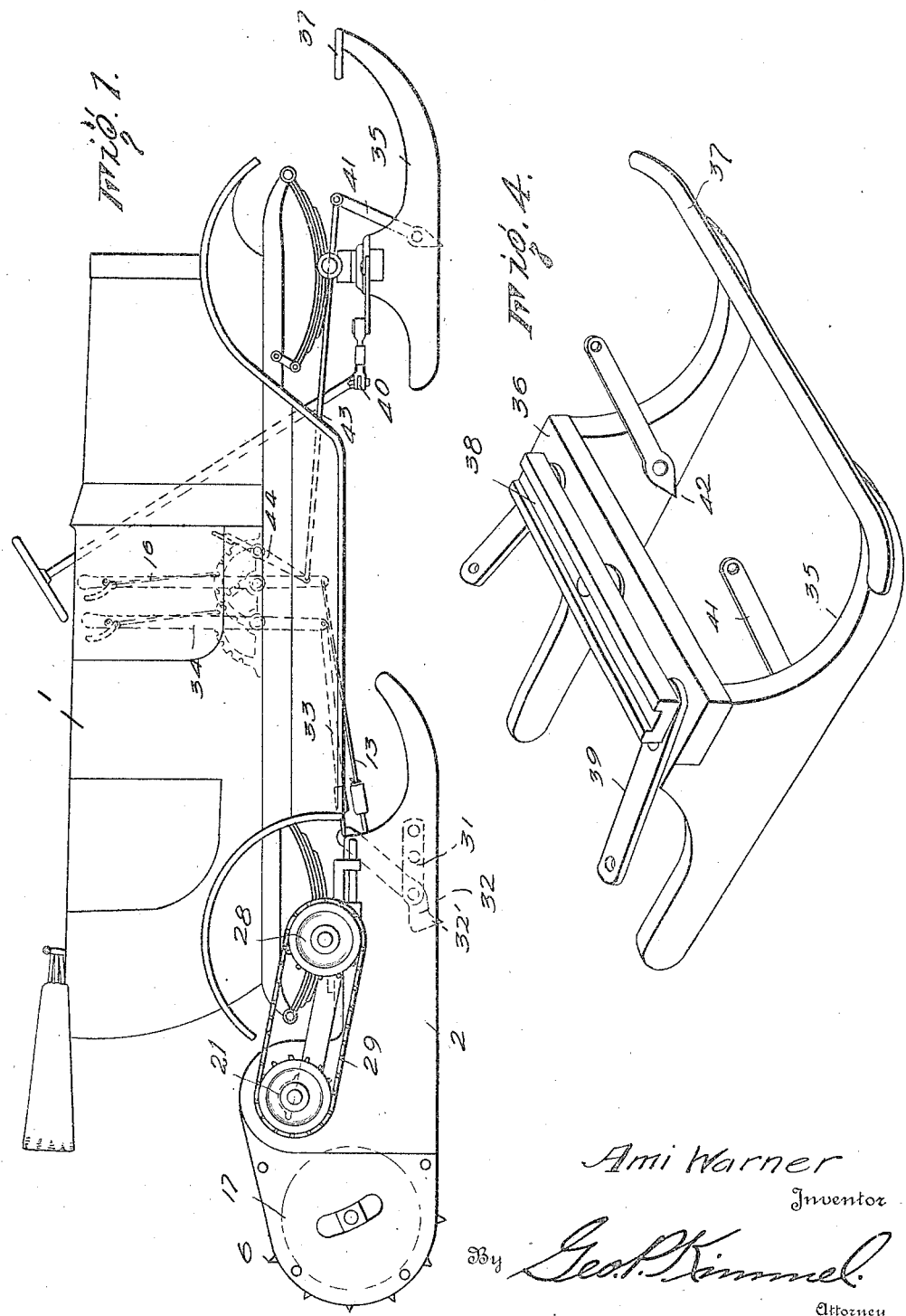

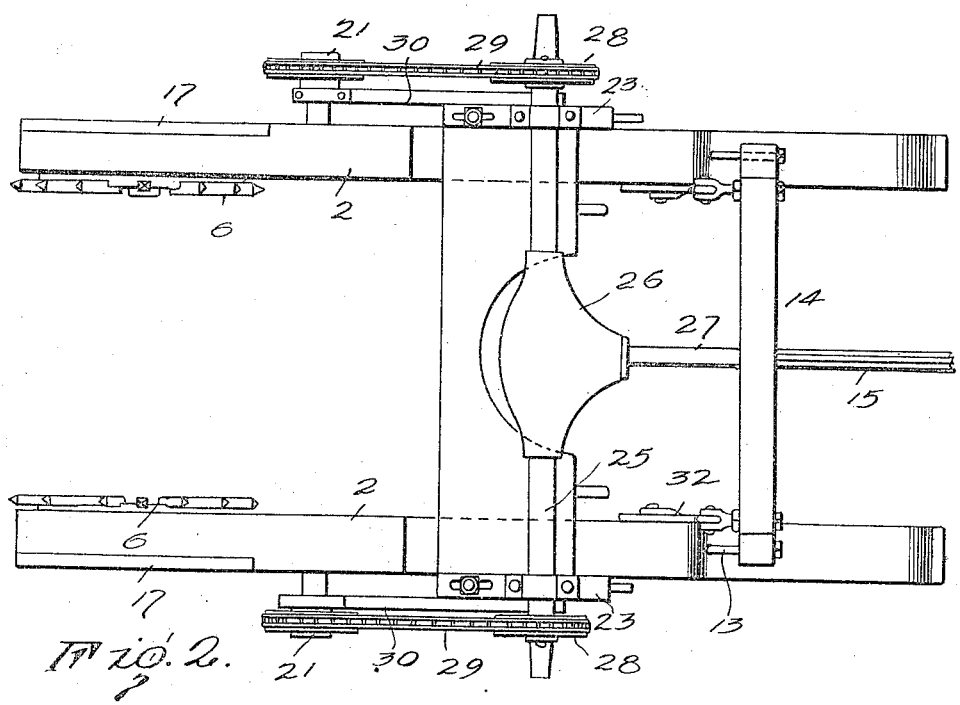
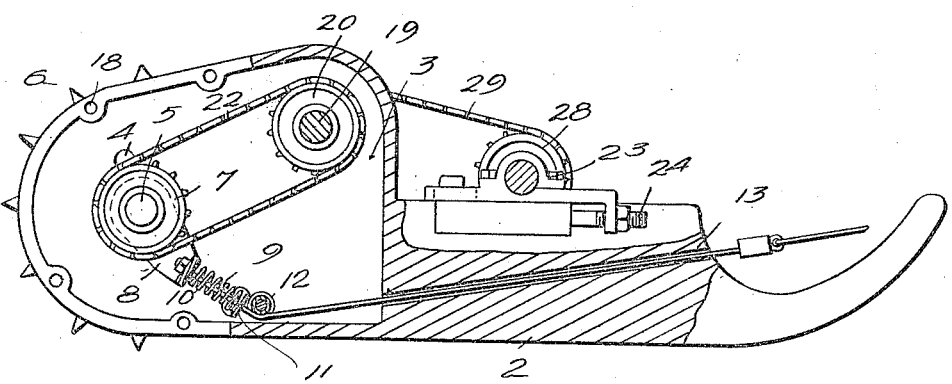

AMI WARNER, OF KEENE, NEW YORK.

SELF-PROPELLED SLED.

1,254,456. Specification of Letters Patent. Patented Jan. 22, 1918.

Application filed March 7, 1917. Serial No. 153,054.

*To all whom it may concern:*

Be it known that I, AMI WARNER, a citizen of the United States, and resident of Keene, in the county of Essex and State of New York, have invented certain new and useful Improvements in Self-Propelled Sleds, of which the following is a specification.

This invention relates to sleighs and has more especial reference to an improved self-propelled sleigh.

The invention has for its principal object to provide a self-propelled sleigh which is capable of traveling over snow and ice covered surfaces at varying speed and will comfortably and safely carry the occupants thereof.

It is also an object of the invention to provide novel driving elements, the said elements being adjustably mounted on certain of the runners of the sleigh to allow them to be engaged with snow or ice covered surfaces at the desired depth, thus insuring full driving power.

All of the foregoing together with additional advantageous details and arrangements of parts of the preferred embodiment of my invention will be clear from the specific description hereinafter contained, when read in connection with the accompanying drawings forming parts thereof, wherein said embodiment of the invention is illustrated for the purpose of facilitating a full understanding of the present improvements.

In the drawings:

Figure 1 is a side elevation of my improved self-propelled sleigh;

Fig. 2 is a detail in top plan of the rear runners;

Fig. 3 is a longitudinal section through one of the same; and

Fig. 4 is a detail in perspective of the forward runners.

Referring now more specifically to the several figures of the said drawings and in connection with which like reference numerals will refer to corresponding parts, there is provided the conventional type of motor vehicle body designated in its entirety by the numeral 1, the said body having the forward and rear wheels removed therefrom in order that the corresponding axles may be properly mounted upon the several runners of the improved sleigh construction.

Rear runners serve as means for receiving and supporting the rear axle and portion of the vehicle body 1 thereupon, these runners being designated 2. Since each of the runners 2 is constructed in a like manner, reference will be hereinafter had to but one of the same, it being understood that such reference may be readily applied to each construction.

A recess 3 is cut in the rear portion of the runner 2 and has formed therein an arcuate slot 4, which slot receives therethrough a stub axle 5 carrying upon one end thereof a spurred driving wheel 6 and a sprocket wheel 7 upon the other end thereof. The driving wheel 6 and the sprocket wheel 7, obviously, are arranged upon the opposite sides of the runner to prevent lateral displacement of the same. A substantially U-shaped bail 8 is engaged with that portion of the stub axle 5 in proximity of the sprocket wheel 7 and has one end of a cable 9 engaged with the same, the cable in turn, extending through an expansible coiled spring 10, one end of which bears upon the adjacent end of the bail 8 while the remaining end bears upon a suitable bracket 11 secured in the recessed portion 3 of the runner 2. A pulley 12 is positioned adjacent the bearing bracket 11, and receives a portion of the cable 9 thereover, thus, serving as means for directing the same through an inclined longitudinally disposed way 13 formed in the forward portion of the runners 2, in order that the cable may be extended into engagement with suitable clips carried upon a cross bar 14. A second cable 15 extends from the cross bar 14 into engagement with a lever 16 pivotally mounted in the forward portions of the vehicle body 1 at a point convenient to the driver or operator of the same. To protect the gearing within the recess portion 3 of the runner 2, a covering plate 17 is arranged thereover and is secured in position by passing suitable fastening devices through openings therein as alined with apertured ears 18 formed upon that portion of the runner 2 as adjacent the recess 3. Other stub axles 19 are journaled in suitable bearings upon the rear portions of each of the runners 2 and carry upon their opposite extremities sprocket wheels 20 and 21, about which sprocket chains 22 extend, the free ends of the same being arranged about the sprocket wheel 7.

Adjustable bearings 23 are mounted upon stepped forward portions of each of the runners 2 and are maintained in the desired positions by screws 24 as engaged therewith. A drive shaft 25 of the vehicle is received within the adjustable bearings 23, it of course, being understood that the same have motion imparted thereto by way of the usual differential gearing 26 and power shaft 27. Sprocket wheels 28 are mounted upon the opposite extremities of the drive shaft 25 and are connected to the sprocket wheels 21 through the medium of sprocket chains 29 as extending thereabout. Bracing arms 30 having bearing openings formed in the opposite ends thereof are engaged about the extremities of the stub shaft 19 and the drive shaft 25, thus, serving as means for equalizing the strain.

Brackets 31 are secured to the inner sides of the several rear runners 2 and pivotally thereupon substantially bell crank levers 32, the lower ends of which are toothed as at 32'. A cable or other flexible connection 33 is engaged with the apertured upper extremities of each of the levers 32 and extends forwardly into engagement with a lever 34 pivotally mounted upon the vehicle body 1 adjacent the lever 16. By rocking the levers 34, the several toothed levers 32 may be swung into positions to cause the toothed portions 32' thereon to be engaged with the snow or ice covered surface, thus, serving as means for braking or retarding the motion of the vehicle.

Forward runners designated 35 are provided and are connected by cross bars 36 and 37, the cross bar 36 pivotally supporting thereon a bar 38, whereby the forward axle of the vehicle body may be received and secured thereto by suitable fastening devices. Steering arms 39 are securely engaged with the cross bar 36 and have their apertured ends engaged with the steering gear 40 of the vehicle.

Levers 41 having certain of the ends thereof sharpened as at 42 are pivotally mounted upon the inner sides of the forward runners 35 and have their apertured upper ends engaged by a rod 43 which extends rearwardly of the vehicle body into engagement with a suitable foot lever 44 mounted therein at a point in proximity of the levers 16 and 34. By rocking the foot lever 44, the several levers 41 will have the sharpened portions 42 thereof moved into engagement with the surface, thereby, affording means for preventing undue lateral movement of the forward runners during steering of the vehicle or for preventing swerving of the vehicle from its course.

Obviously, the construction shown is capable of considerable modification and such modification as is within the scope of my claim, I consider within the spirit of my invention.

I claim:

In a vehicle of the character described, the combination with the rear runner of the same, said runner having a recessed portion formed therein, of a spurred driving wheel arranged in said recessed portion and capable of moving vertically with relation to the runner, a substantially U-shaped bail connected to the spurred driving wheel, resilient means engaged with the bail for normally retaining the same in raised position, and manually operable means also engaged with said bail for moving the driving wheel into engagement with a surface.

In testimony whereof, I affix my signature hereto.

AMI WARNER.